United States Patent
Bolton et al.

(10) Patent No.: US 12,294,395 B2
(45) Date of Patent: May 6, 2025

(54) MULTI-MODE ANTENNA TUNER CIRCUIT AND RELATED APPARATUS

(71) Applicant: Qorvo US, Inc., Greensboro, NC (US)

(72) Inventors: Eric K. Bolton, Kernersville, NC (US); Daniel Charles Kerr, Oak Ridge, NC (US)

(73) Assignee: Qorvo US, Inc., Greensboro, NC (US)

( * ) Notice: Subject to any disclaimer, the term of this patent is extended or adjusted under 35 U.S.C. 154(b) by 383 days.

(21) Appl. No.: 17/792,116

(22) PCT Filed: Jul. 10, 2020

(86) PCT No.: PCT/US2020/041609
§ 371 (c)(1),
(2) Date: Jul. 11, 2022

(87) PCT Pub. No.: WO2021/145922
PCT Pub. Date: Jul. 22, 2021

(65) Prior Publication Data
US 2023/0047577 A1    Feb. 16, 2023

Related U.S. Application Data

(60) Provisional application No. 62/961,738, filed on Jan. 16, 2020.

(51) Int. Cl.
*H04B 1/04* (2006.01)
*H04B 1/18* (2006.01)
*H04B 1/40* (2015.01)

(52) U.S. Cl.
CPC ............ *H04B 1/0458* (2013.01); *H04B 1/18* (2013.01); *H04B 1/40* (2013.01)

(58) Field of Classification Search
CPC .......... H04B 1/0458; H04B 1/18; H04B 1/40; H04B 1/0053; H04B 1/00; H04B 1/0064;
(Continued)

(56) References Cited

U.S. PATENT DOCUMENTS 8,706,053 B2 *   4/2014   Camp, Jr. ............... H04B 1/18
                                                    455/77
10,172,092 B1 *  1/2019   Zhou ...................... H04W 88/02
(Continued)

FOREIGN PATENT DOCUMENTS

CN      103155431 A      6/2013
CN      104737453 A      6/2015
(Continued)

OTHER PUBLICATIONS

Invitation to Pay Additional Fees and Partial International Search for International Patent Application No. PCT/US2020/041609, mailed Oct. 29, 2020, 15 pages.
(Continued)

*Primary Examiner* — Lana N Le
(74) *Attorney, Agent, or Firm* — Withrow & Terranova, P.L.L.C.

(57) ABSTRACT

A multi-mode antenna tuner circuit and related apparatus are provided. The multi-mode antenna tuner circuit can be configured to operate in a low-current mode or a high-power mode. When operating in the high-power mode, the multi-mode antenna tuner circuit can provide full-fledged functionalities and consume a higher amount of current. In contrast, in the low-current mode, the multi-mode antenna tuner circuit provides reduced functionality and consumes a lower amount of current. In this regard, in a wireless communication apparatus employing multiple multi-mode antenna tuner circuits, it is possible to opportunistically configure some multi-mode antenna tuner circuits to operate in the low-current mode based on an operating environment (e.g., frequency band, location, etc.) and internal state (e.g., battery level, signal strength, etc.) of the wireless communication apparatus. As a result, it may be possible to reduce
(Continued)

consumption and heat dissipation without compromising performance of the wireless communication apparatus.

17 Claims, 7 Drawing Sheets

(58) Field of Classification Search
CPC ........ H04B 1/401; H04B 17/12; H04B 17/18; H04B 5/70; H04B 1/72; H04B 1/005; H04B 17/101; H04B 17/11; H01Q 5/00; H01Q 1/243; H01Q 1/24; H01Q 5/364; H01Q 9/0442; H01Q 25/04; H01Q 1/523; H01Q 5/371; H04W 88/02

See application file for complete search history.

(56) References Cited

U.S. PATENT DOCUMENTS

| | | | |
|---|---|---|---|
| 10,277,267 B1* | 4/2019 | Kerselaers | H04B 1/40 |
| 2014/0044021 A1 | 2/2014 | Alberth, Jr. et al. | |
| 2015/0256311 A1* | 9/2015 | Oksman | H04L 5/0044 370/468 |
| 2016/0276983 A1* | 9/2016 | Vaillancourt | H04B 1/18 |
| 2017/0012651 A1* | 1/2017 | Ellä | H04B 1/0064 |
| 2017/0373398 A1 | 12/2017 | Komulainen et al. | |
| 2019/0214720 A1* | 7/2019 | Trocke | H04B 1/00 |
| 2024/0098864 A1* | 3/2024 | Khoury | H04B 1/40 |

FOREIGN PATENT DOCUMENTS

| | | |
|---|---|---|
| CN | 105981302 A | 9/2016 |
| CN | 109219929 A | 1/2019 |
| CN | 110022597 A | 7/2019 |
| WO | 2012027703 A2 | 3/2012 |

OTHER PUBLICATIONS

International Search Report and Written Opinion for International Patent Application No. PCT/US2020/041609, mailed Dec. 21, 2020, 19 pages.
First Office Action for Chinese Patent Application No. 202080093369. 5, mailed Sep. 21, 2024, 17 pages.

* cited by examiner

MULTI-MODE ANTENNA TUNER CIRCUIT AND RELATED APPARATUS

This application is a 35 USC 371 national phase filing of International Application No. PCT/US2020/041609, filed Jul. 10, 2020, the disclosure of which is incorporated herein by reference in its entirety.

RELATED APPLICATIONS

This application claims the benefit of U.S. provisional patent application Ser. No. 62/961,738, filed on Jan. 16, 2020, the disclosure of which is incorporated herein by reference in its entirety.

FIELD OF THE DISCLOSURE

The technology of the disclosure relates generally to an antenna tuner circuit(s) in a wireless communication apparatus.

BACKGROUND

Wireless communication devices have become increasingly common in current society. The prevalence of these wireless communication devices is driven in part by the many functions that are now enabled on such devices. Increased processing capabilities in such devices means that wireless communication devices have evolved from being pure communication tools into sophisticated mobile multimedia centers that enable enhanced user experiences.

The redefined user experience requires higher data rates offered by a variety of radio access technologies (RATs), such as Wi-Fi, long-term evolution (LTE), and fifth-generation new-radio (5G-NR). Accordingly, a wireless communication device may include different transceiver circuits and multiple antennas for communicating wireless communications signals in different RATs and/or radio frequencies. Each of the antennas may be coupled to one or more antenna tuner circuits configured to improve impedance matching, frequency tuning, power handling, and/or linearization of the antenna.

Notably, the wireless communication device may require over a dozen antenna tuner circuits and each antenna tuner circuit may consume approximately 50 µA of current to operate. In this regard, the antenna tuner circuits alone can consume over 600 µA of current, which can lead to increased power consumption and heat dissipation in the wireless communication device.

SUMMARY

Aspects disclosed in the detailed description include a multi-mode antenna tuner circuit and related apparatus. In embodiments disclosed herein, the multi-mode antenna tuner circuit can be configured to operate in a low-current mode or a high-power mode. When operating in the high-power mode, the multi-mode antenna tuner circuit can provide full-fledged functionalities and consume a higher amount of current. In contrast, in the low-current mode, the multi-mode antenna tuner circuit provides reduced functionality and consumes a lower amount of current. In this regard, in a wireless communication apparatus employing multiple multi-mode antenna tuner circuits, it is possible to opportunistically configure some multi-mode antenna tuner circuits to operate in the low-current mode based on an operating environment (e.g., frequency band, location, etc.) and internal state (e.g., battery level, signal strength, etc.) of the wireless communication apparatus. As a result, it may be possible to reduce consumption and heat dissipation without compromising performance of the wireless communication apparatus.

In one aspect, a multi-mode antenna tuner circuit is provided. The multi-mode antenna tuner circuit includes a voltage input coupled to a voltage source to receive a supply voltage. The multi-mode antenna tuner circuit also includes a signal output coupled to an antenna port to output a radio frequency (RF) signal. The multi-mode antenna tuner circuit also includes a first set of circuits that collectively consume a first amount of electrical current. The multi-mode antenna tuner circuit also includes a second set of circuits that collectively consume a second amount of electrical current larger than the first amount of electrical current. The multi-mode antenna tuner circuit also includes a control circuit. The control circuit is configured to receive an instruction that indicates a low-current mode or a high-power mode. The control circuit is also configured to cause the first set of circuits to be activated and the second set of circuits to be deactivated when the instruction indicates the low-current mode. The control circuit is also configured to cause the first set of circuits to be deactivated and the second set of circuits to be activated when the instruction indicates the high-power mode.

In another aspect, a wireless communication apparatus is provided. The wireless communication apparatus includes one or more antenna front-end circuits. Each of the antenna front-end circuits includes an antenna port coupled to an antenna. Each of the antenna front-end circuits also includes a plurality of multi-mode antenna tuner circuits coupled to the antenna port. The wireless communication apparatus also includes a master control circuit coupled to the one or more antenna front-end circuits. The master control circuit is configured to determine that at least one multi-mode antenna tuner circuit among the plurality of multi-mode antenna tuner circuits in at least one of the one or more antenna front-end circuits can operate in a low-current mode. The master control circuit is also configured to cause the at least one multi-mode antenna tuner circuit to operate in the low-current mode.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a multi-mode antenna tuner circuit and related apparatus. In embodiments disclosed herein, the multi-mode antenna tuner circuit can be configured to operate in a low-current mode or a high-power mode. When operating in the high-power mode, the multi-mode antenna tuner circuit can provide full-fledged functionalities and consume a higher amount of current. In contrast, in the low-current mode, the multi-mode antenna tuner circuit provides a reduced functionality and consumes a lower amount of current. In this regard, in a wireless communication apparatus employing multiple multi-mode antenna tuner circuits, it is possible to opportunistically configure some multi-mode antenna tuner circuits to operate in the low-current mode based on operating environment (e.g., frequency band, location, etc.) and internal state (e.g., battery level, signal strength, etc.) of the wireless communication apparatus. As a result, it may be possible to reduce consumption and heat dissipation without compromising performance of the wireless communication apparatus.

Figure 1:
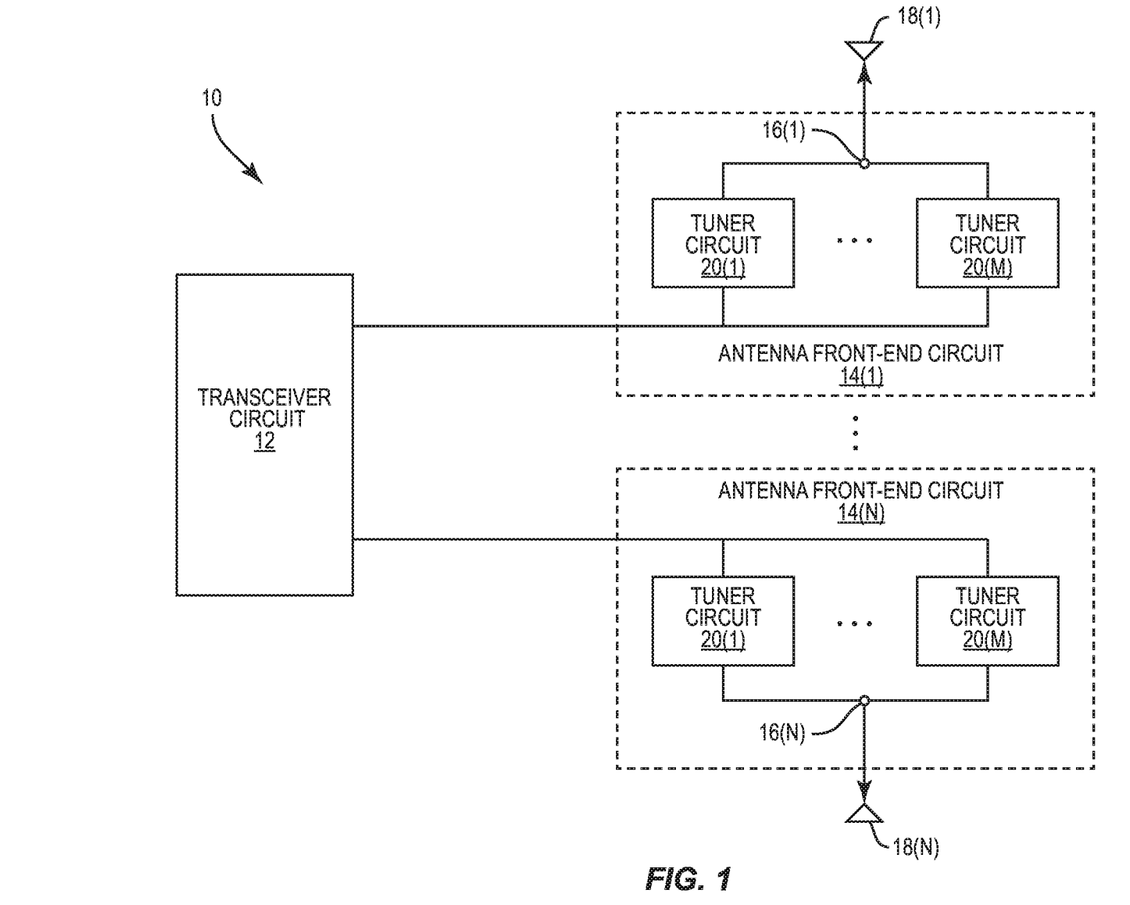
FIG. 1 is a schematic diagram of an exemplary conventional wireless communication apparatus.
Figure 2A:
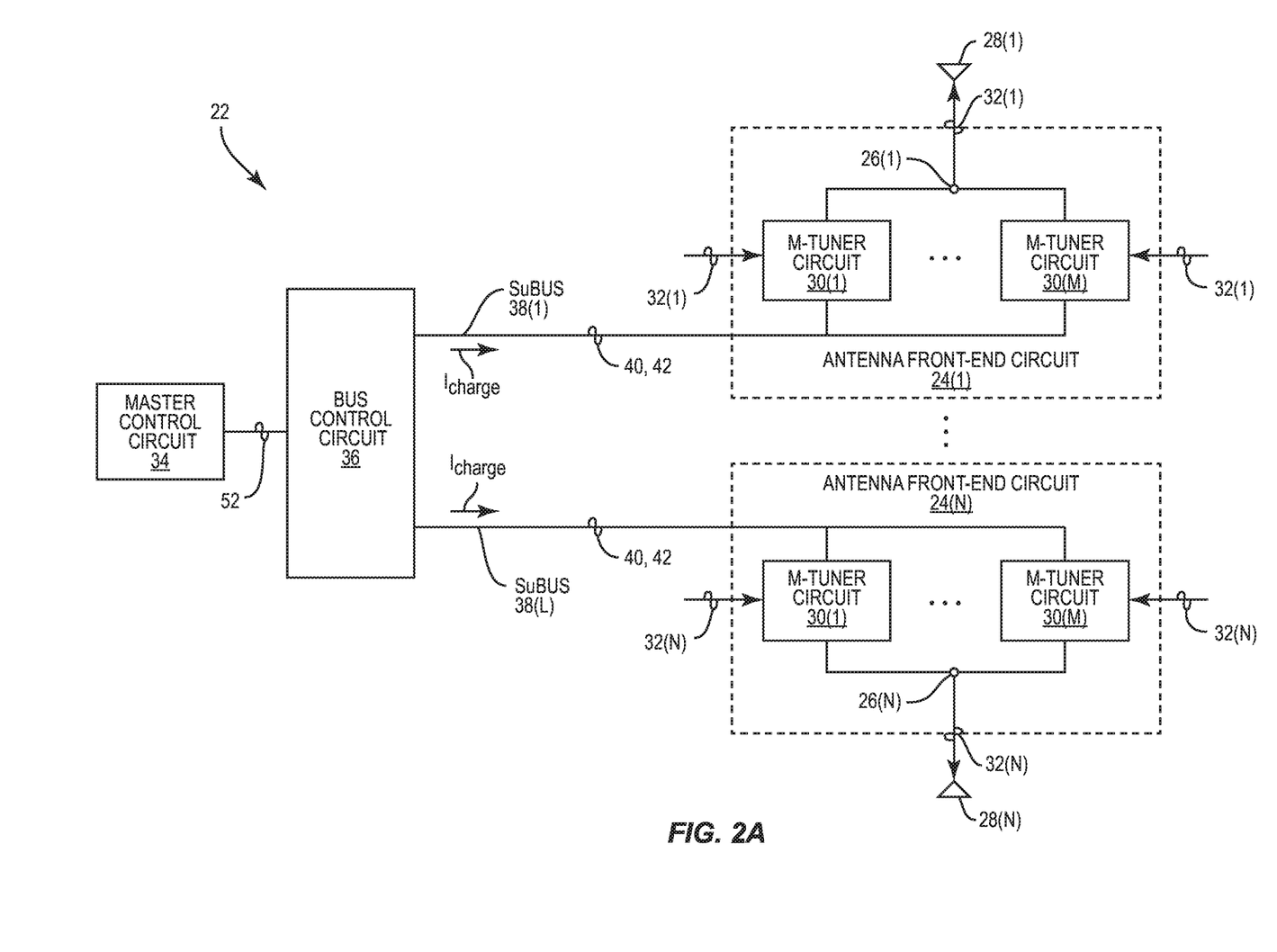
FIG. 2A is a schematic diagram of an exemplary wireless communication apparatus 22 configured according to an embodiment of the present disclosure to enable opportunistic reduction of electrical current consumption.

Before discussing a multi-mode antenna tuner circuit of the present disclosure, starting at FIG. 2A, a brief overview of a conventional wireless communication apparatus is first provided with reference to FIG. 1 to help understand current consumption issues associated with conventional antenna tuner circuits.

In this regard, FIG. 1 is a schematic diagram of an exemplary conventional wireless communication apparatus 10. The conventional wireless communication apparatus 10 includes a transceiver circuit 12 and a number of antenna front-end circuits 14(1)-14(N). The antenna front-end circuits 14(1)-14(N) include a number of antenna ports 16(1)-16(N) each coupled to a respective one of a number of antennas 18(1)-18(N). Each of the antenna front-end circuits 14(1)-14(N) includes one or more antenna tuner circuits 20(1)-20(M) that are coupled to a respective one of the antenna ports 16(1)-16(N).

Notably, each of the antenna tuner circuits 20(1)-20(M) may be configured to carry out a specific functionality for the respective one of the antennas 18(1)-18(N). In this regard, it would require all of the antenna tuner circuits 20(1)-20(M) to operate concurrently to carry out a full-fledged functionality for the respective one of the antennas 18(1)-18(N).

The antenna tuner circuits 20(1)-20(N) in any of the antenna front-end circuits 14(1)-14(N) can be configured by the transceiver circuit 12 to concurrently operate in a high-power mode, in which all of the antenna tuner circuits 20(1)-20(M) are activated and operate concurrently. In this regard, each of the antenna tuner circuits 20(1)-20(M) may consume approximately 50 µA of electrical current.

The antenna tuner circuits 20(1)-20(N) in any of the antenna front-end circuits 14(1)-14(N) can also be configured by the transceiver circuit 12 to concurrently operate in a low-power mode. In this regard, all of the antenna tuner circuits 20(1)-20(M) are deactivated and consume very little electrical current.

The conventional wireless communication apparatus 10 may be configured to support multiple radio access technologies (RATs) and/or operate in multiple radio frequency (RF) bands. Accordingly, the conventional wireless communication apparatus 10 can include multiple antennas each supported by multiple antenna tuner circuits. For example, if the conventional wireless communication apparatus 10 is configured to support four-by-four (4×4) multiple-input, multiple-output (MIMO) communication with 4 antennas, and each antenna is supported by three (3) antenna tuner circuits, the conventional wireless communication apparatus 10 will end up having twelve (12) antenna tuner circuits. Accordingly, the 12 antenna tuner circuits will draw approximately 600 µA of electrical current when concurrently operating in the high-power mode. The large amount of electrical current drawn by the antenna tuner circuits may significantly reduce battery life of the conventional wireless communication apparatus 10, thus compromising end user experience. Hence, it may be desirable to reduce the current consumption by the antenna tuner circuits to help prolong the battery life of the conventional wireless communication apparatus 10.

In this regard, FIG. 2A is a schematic diagram of an exemplary wireless communication apparatus 22 configured according to an embodiment of the present disclosure to enable opportunistic reduction of electrical current consumption. In a non-limiting example, the wireless communication apparatus 22 can be a wireless-capable device such as a smartphone, a tablet, a laptop computer, a smart appliance, and so on. In another non-limiting example, the wireless communication apparatus 22 can also be a network node such as a cellular base station, a wireless access point, a low-power radio head, and so on.

The wireless communication apparatus 22 includes one or more antenna front-end circuits 24(1)-24(N). The antenna front-end circuits 24(1)-24(N) include a number of antenna ports 26(1)-26(N) each coupled to a respective one of a number of antennas 28(1)-28(N). Each of the antenna front-end circuits 24(1)-24(N) includes a number of multi-mode antenna tuner circuits 30(1)-30(M) (denoted as "M-Tuner Circuit") coupled to a respective one of the antenna ports 26(1)-26(N). The antenna front-end circuits 24(1)-24(N) are configured to receive one or more radio frequency (RF) signals 32(1)-32(N) and output the RF signals 32(1)-32(N) to the antenna ports 26(1)-26(N).

In a non-limiting example, each of the multi-mode antenna tuner circuits 30(1)-30(M) can be configured to carry out a specific function (e.g., load detection, impedance tuning, aperture impedance tuning, etc.) for the respective one of the antennas 28(1)-28(N) coupled to the respective one of the antenna ports 26(1)-26(N). For example, in the antenna front-end circuit 24(1), the multi-mode antenna tuner circuit 30(1) can be configured to perform load detection and the multi-mode antenna tuner circuit 30(M) can be configured to perform impedance tuning for the antenna 28(1) coupled to the antenna port 26(1).

As discussed in detail below, the multi-mode antenna tuner circuits 30(1)-30(M) in each of the antenna front-end circuits 24(1)-24(N) can be individually configured to operate in a low-current mode or a high-power mode. Each of the multi-mode antenna tuner circuits 30(1)-30(M) will consume a higher amount of electrical current (e.g., 50 µA) when operating in the high-power mode. In contrast, each of the multi-mode antenna tuner circuits 30(1)-30(M) will consume a lower amount of electrical current (e.g., 10 to 12 µA) when operating in the low-current mode. As such, it is possible to opportunistically configure some or all of the multi-mode antenna tuner circuits 30(1)-30(M) to operate in the low-current mode based on such factors as operating environment (e.g., frequency band, location, etc.) and internal state (e.g., battery level, signal strength, etc.) of the wireless communication apparatus 22. As a result, it may be possible to reduce consumption and heat dissipation without compromising performance of the wireless communication apparatus 22.

The wireless communication apparatus 22 includes a master control circuit 34, which can be a transceiver circuit, as an example. The wireless communication apparatus 22 can also include a bus control circuit 36, which is coupled to the master control circuit 34. The bus control circuit 36 is coupled to the multi-mode antenna tuner circuits 30(1)-30(M) in each of the antenna front-end circuits 24(1)-24(N) via one or more single-wire buses 38(1)-38(L) (denoted as "SuBUS") each consisting of one conductive wire.

In a non-limiting example, each of the multi-mode antenna tuner circuits 30(1)-30(M) in each of the antenna front-end circuits 24(1)-24(N) can function as a slave circuit to the bus control circuit 36. In this regard, each of the multi-mode antenna tuner circuits 30(1)-30(M) is uniquely identified by a respective unique slave identification (USID). Accordingly, the bus control circuit 36, which serves as a master circuit, can communicate with the multi-mode antenna tuner circuits 30(1)-30(M) in each of the antenna front-end circuits 24(1)-24(N) based on the USIDs.

Figure 2B:
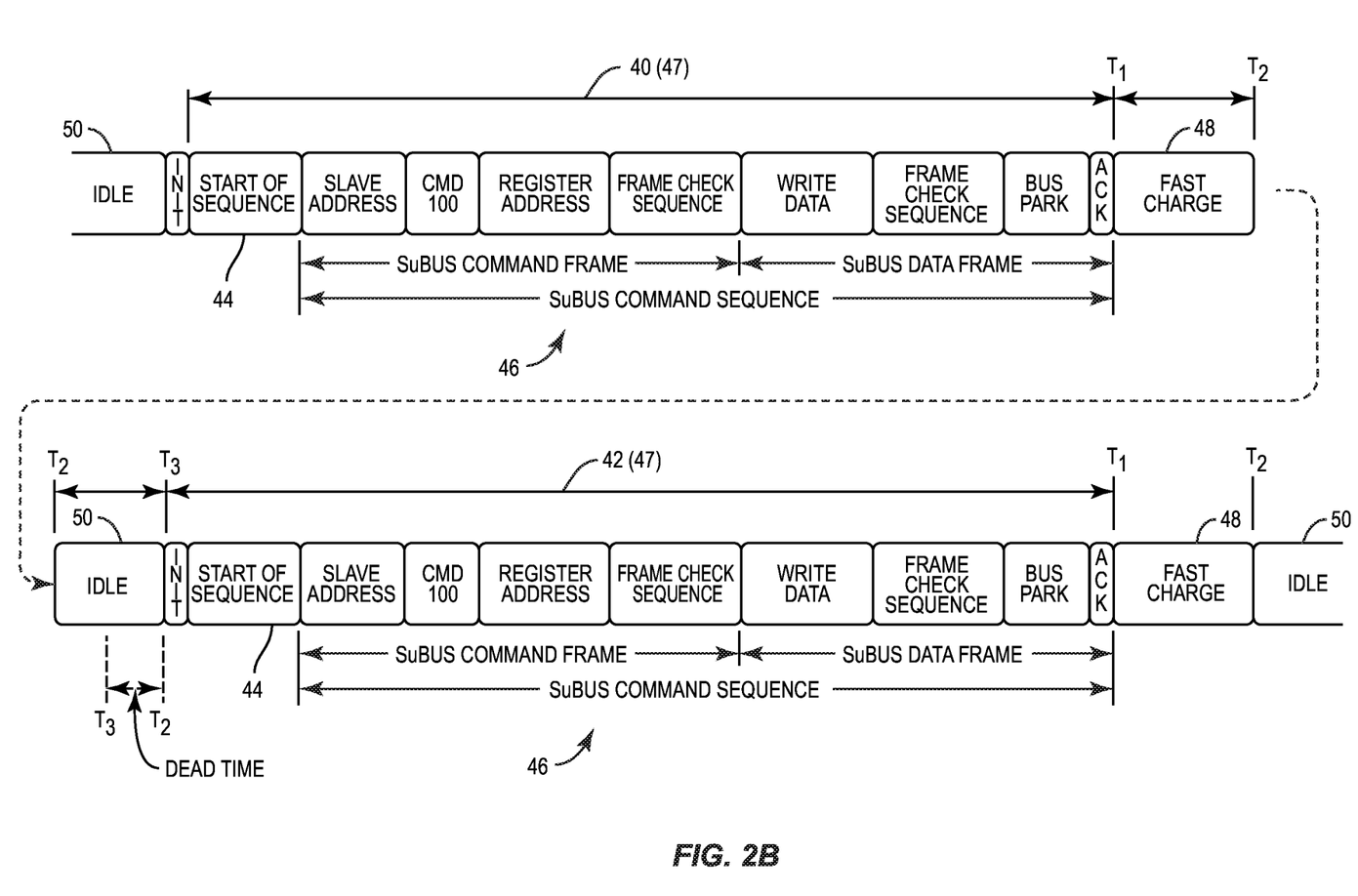
FIG. 2B is a schematic diagram providing an exemplary illustration of one or more SuBUS telegrams communicated over a single-wire bus(es) in the wireless communication apparatus of FIG. 2A.

The bus control circuit 36 and the multi-mode antenna tuner circuits 30(1)-30(M) in each of the antenna front-end circuits 24(1)-24(N) are configured to communicate based on SuBUS telegrams, as illustrated in FIG. 2B. In this regard, FIG. 2B is a schematic diagram providing an exemplary illustration of one or more SuBUS telegrams 40, 42 communicated over the single-wire buses 38(1)-38(L) in the wireless communication apparatus 22 of FIG. 2A.

Each of the SuBUS telegrams 40, 42 includes a start of sequence (SOS) sequence 44 and a SuBUS command sequence 46 immediately succeeding the SoS sequence 44. The SuBUS command sequence 46 may correspond to a predefined SuBUS operation (e.g., register-read or register-write). The SOS sequence 44 always precedes the SuBUS command sequence 46 and is always communicated from the bus control circuit 36 to the multi-mode antenna tuner circuits 30(1)-30(M) in each of the antenna front-end circuits 24(1)-24(N) in FIG. 2A. Accordingly, each of the SuBUS telegrams 40, 42 represents a communication period during which the bus control circuit 36 can communicate with any of the multi-mode antenna tuner circuits 30(1)-30(M) in each of the antenna front-end circuits 24(1)-24(N).

The SuBUS telegram 42, which succeeds the SuBUS telegram 40, may be separated from the SuBUS telegram 40 by a fast-charging period 48 that starts at time $T_1$ and ends at time $T_2$ ($T_2 > T_1$) and an idle period 50 that starts at time $T_2$ and ends at time $T_3$ ($T_3 > T_2$). The fast-charging period 48 is configured to allow each of the multi-mode antenna tuner circuits 30(1)-30(M) to draw a fast-charging current $I_{charge}$ (shown in FIG. 2A) via a respective one of the single-wire buses 38(1)-38(L). As discussed later in FIG. 3A, the fast-charging current $I_{charge}$ allows each of the multi-mode antenna tuner circuits 30(1)-30(M) to generate a supply voltage to power a respective antenna tuning operation.

In this regard, each of the single-wire buses 38(1)-38(L) is said to be in a fast-charge state during the fast-charging period 48. The idle period 50 may be a no-activity period in which the bus control circuit 36 and the multi-mode antenna tuner circuits 30(1)-30(M) in each of the antenna front-end circuits 24(1)-24(N) may be inactive to help conserve power. Accordingly, each of the single-wire buses 38(1)-38(L) is said to be in an idle state during the idle period 50.

The bus control circuit 36 is configured to suspend the SuBUS telegram communication over the single-wire buses 38(1)-38(L) during the fast-charging period 48 and the idle period 50. Accordingly, the bus control circuit 36 and the multi-mode antenna tuner circuits 30(1)-30(M) in each of the antenna front-end circuits 24(1)-24(N) are configured to refrain from communicating SuBUS telegram(s) and data payload(s) from time $T_1$ to $T_3$. In this regard, the single-wire buses 38(1)-38(L) can be said to be in a suspension mode between time $T_1$ and $T_3$.

With reference back to FIG. 2A, the master control circuit 34 is configured to determine that at least one multi-mode antenna tuner circuit among the multi-mode antenna tuner circuits 30(1)-30(M) in at least one of the antenna front-end circuits 24(1)-24(N) can operate in the low-current mode. Accordingly, the master control circuit 34 can generate an instruction 52 to cause the at least one multi-mode antenna tuner circuit among the multi-mode antenna tuner circuits 30(1)-30(M) to operate in the low-current mode. For example, the master control circuit 34 can determine that the multi-mode antenna tuner circuit 30(1) in the antenna front-end circuit 24(1) and the multi-mode antenna tuner circuit 30(M) in the antenna front-end circuit 24(N) can operate in the low-current mode. Accordingly, the master control circuit 34 can generate the instruction 52 to cause the multi-mode antenna tuner circuit 30(1) in the antenna front-end circuit 24(1) and the multi-mode antenna tuner circuit 30(M) in the antenna front-end circuit 24(N) to operate in the low-current mode.

The master control circuit 34 may also determine that at least another multi-mode antenna tuner circuit among the multi-mode antenna tuner circuits 30(1)-30(M) in the at least one of the antenna front-end circuits 24(1)-24(N) can operate in the high-power mode. Accordingly, the master control circuit 34 can generate the instruction 52 to cause the at least another multi-mode antenna tuner circuit among the multi-mode antenna tuner circuits 30(1)-30(M) to operate in the high-power mode. For example, the master control circuit 34 can determine that the multi-mode antenna tuner circuit 30(M) in the antenna front-end circuit 24(1) and the multi-mode antenna tuner circuit 30(1) in the antenna front-end circuit 24(N) can operate in the high-power mode. Accordingly, the master control circuit 34 can generate the instruction 52 to cause the multi-mode antenna tuner circuit 30(M) in the antenna front-end circuit 24(1) and the multi-mode antenna tuner circuit 30(1) in the antenna front-end circuit 24(N) to operate in the high-power mode.

The master control circuit 34 may determine which of the multi-mode antenna tuner circuits 30(1)-30(M) should operate in the low-current mode and/or which of the multi-mode antenna tuner circuits 30(1)-30(M) should operate in the high-power mode based on a variety of factors. In a non-limiting example, the master control circuit 34 can determine the low-current mode and/or the high-power mode based on such factors as environmental condition (e.g., distance to an RF transmitter/receiver, indoor/outdoor, obstacles, user density, etc.), RF condition (e.g., RF band/spectrum, transmission power, receive sensitivity, interference, attenuation, etc.), antenna impedance measurement, and/or battery condition.

The bus control circuit 36 receives the instruction 52 from the master control circuit 34. Accordingly, the bus control circuit 36 can encode the instruction 52 into the SuBUS telegrams 40, 42 (also referred to as "bus telegrams"), as shown in FIG. 2A, and provide the SuBUS telegrams 40, 42 to any of the multi-mode antenna tuner circuits 30(1)-30(M) in any of the antenna front-end circuits 24(1)-24(N).

The multi-mode antenna tuner circuits 30(1)-30(M) in the antenna front-end circuits 24(1)-24(N) can be implemented based on different configurations, as discussed in FIGS. 3A, 3B, 4A, and 4B below. Common elements between FIGS. 2A, 3A, 3B, 4A, and 4B are shown therein with common element numbers and will not be re-described herein.

Figure 3A:
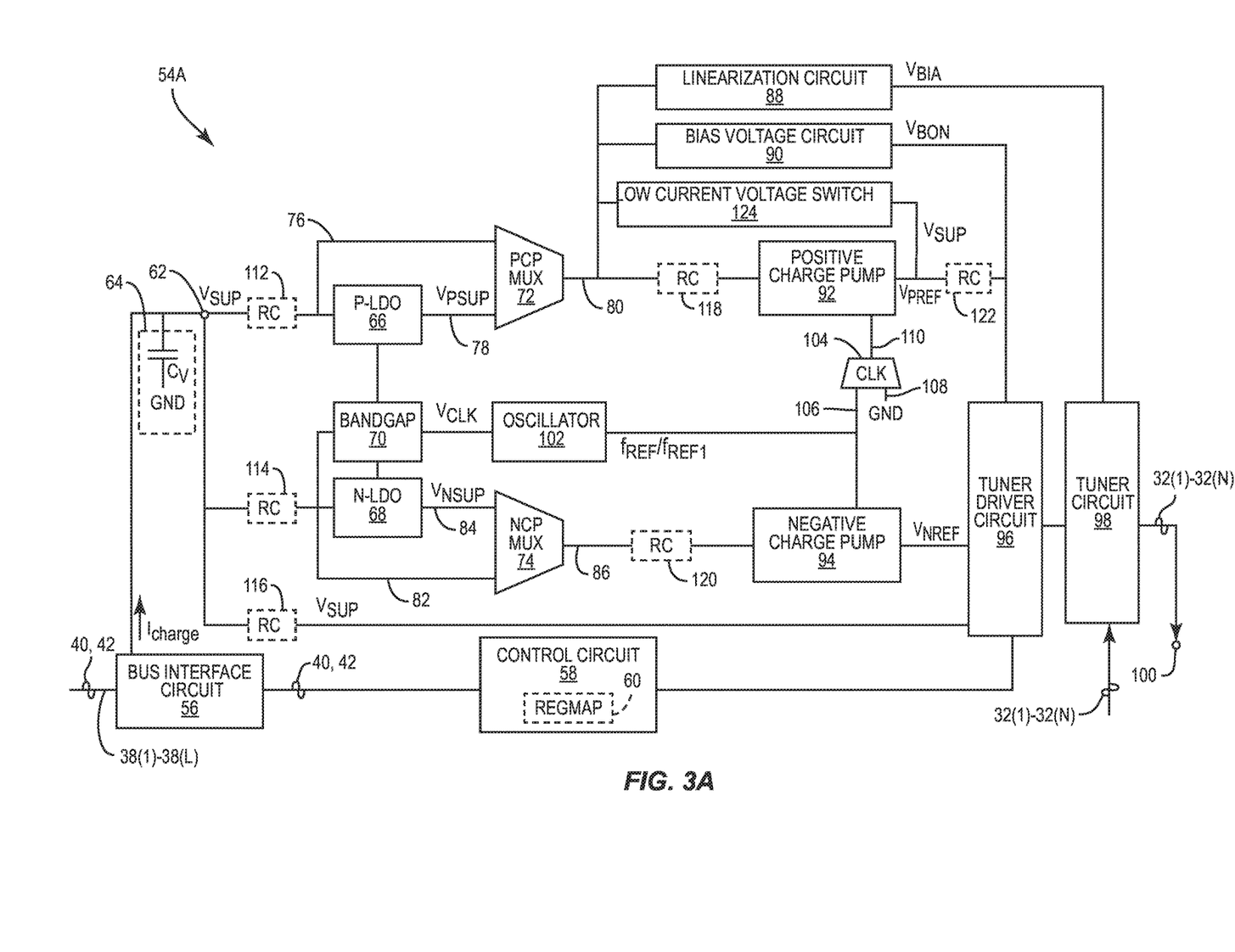
FIG. 3A is a schematic diagram of an exemplary multi-mode antenna tuner circuit configured according to one embodiment of the present disclosure.

FIG. 3A is a schematic diagram of an exemplary multi-mode antenna tuner circuit 54A configured according to one embodiment of the present disclosure. The multi-mode antenna tuner circuit 54A can be provided in any of the antenna front-end circuits 24(1)-24(N) to function as any of the multi-mode antenna tuner circuits 30(1)-30(M).

In a non-limiting example, the multi-mode antenna tuner circuit 54A includes a bus interface circuit 56. The bus interface circuit 56 can be coupled to any of the single-wire buses 38(1)-38(L) to receive the SuBUS telegrams 40, 42 from the bus control circuit 36 during a communication period 47 (shown in FIG. 2B) and to draw the fast-charging current $I_{charge}$ from the bus control circuit 36 during the fast-charging period 48.

The multi-mode antenna tuner circuit 54A includes a control circuit 58, which can be a microprocessor or a field-programmable gate array (FPGA), as an example. The control circuit 58 may be separated from the bus interface circuit 56 or integrated with the bus interface circuit 56. The control circuit 58 is configured to decode the SuBUS telegrams 40, 42 to extract the instruction 52. The control circuit 58 may include a register 60 (denoted as "REGMAP") configured to store the instruction 52. In a non-limiting example, the instruction 52 can be stored as a binary bitmap, wherein a binary value "0" (also referred to as "a first value") and a binary value "1" (also referred to as "a second value") can represent the low-current mode and the high-power mode, respectively. Thus, by setting the register 60 to the first value or the second value, the control circuit 58 can cause the multi-mode antenna tuner circuit 54A to operate in the low-current mode or the high-power mode.

Upon receiving the instruction 52 that indicates the low-current mode, the control circuit 58 may first determine whether the register 60 is currently set to the second value. If the register 60 is determined to have the second value, it is an indication that the multi-mode antenna tuner circuit 54A is currently operating in the high-power mode. In other words, the master control circuit 34 in FIG. 2A intends to switch the multi-mode antenna tuner circuit 54A from the high-power mode to the low-current mode. In this regard, the control circuit 58 may set the register 60 to the first value after a delay period (e.g., approximately 50 µs) from receiving the instruction 52 that indicates the low-current mode. As such, the high-power mode is maintained during the delay period, thus making it possible to maintain a hot-switching performance in the presence of the signals 32(1)-32(N).

The multi-mode antenna tuner circuit 54A includes a voltage input 62 and a voltage source 64 coupled between the bus interface circuit 56 and the voltage input 62. In a non-limiting example, the voltage source 64 includes a capacitor $C_V$ coupled between the voltage input 62 and ground (GND). During the fast-charging period 48, the fast-charging current $I_{charge}$ received from the bus control circuit 36 charges the capacitor $C_V$ to provide a supply voltage $V_{SUP}$ at the voltage input 62. Accordingly, the supply voltage $V_{SUP}$ powers the multi-mode antenna tuner circuit 54A to operate in the low-current mode or the high-power mode during the communication period 47. In this regard, the capacitor $C_V$ is repeatedly charged during the fast-charging period 48 and discharged during the communication period 47, as shown in FIG. 2B. In this regard, the supply voltage $V_{SUP}$ will be higher (e.g., 1.95 V) when the capacitor $C_V$ is fully charged and becomes lower (e.g., 1.65 V) when the capacitor $C_V$ begins to discharge.

The multi-mode antenna tuner circuit 54A includes a positive low-dropout (LDO) regulator 66 (denoted as "P-LDO"), a negative LDO regulator 68 (denoted as "N-LDO") and a bandgap reference circuit 70 (denoted as "Bandgap"). The positive LDO regulator 66 and the negative LDO regulator 68 are coupled to the voltage input 62 and configured to filter the supply voltage $V_{SUP}$ to create a positive supply voltage $V_{PSUP}$ (e.g., 1.5 V) and a negative supply voltage $V_{NSUP}$ (e.g., −1.5 V) independent of the supply voltage $V_{SUP}$ and temperature variation. The bandgap reference circuit 70 is also coupled to the voltage input 62 and configured to generate a clock reference voltage $V_{CLK}$ based on the supply voltage $V_{SUP}$.

The multi-mode antenna tuner circuit 54A includes a positive voltage multiplexer 72 (denoted as "PCP MUX") and a negative voltage multiplexer 74 (denoted as "NCP MUX"). The positive voltage multiplexer 72 includes a first voltage input 76, a second voltage input 78, and a first voltage output 80. The first voltage input 76 is coupled to the voltage input 62 and the second voltage input 78 is coupled to the positive LDO regulator 66. The positive voltage multiplexer 72 can be controlled to selectively output the supply voltage $V_{SUP}$ or the positive supply voltage $V_{PSUP}$ at the first voltage output 80. The negative voltage multiplexer 74 includes a third voltage input 82, a fourth voltage input 84, and a second voltage output 86. The third voltage input 82 is coupled to the voltage input 62 and the fourth voltage input 84 is coupled to the negative LDO regulator 68. The negative voltage multiplexer 74 can be controlled to selectively output the supply voltage $V_{SUP}$ or the negative supply voltage $V_{NSUP}$ at the second voltage output 86.

The multi-mode antenna tuner circuit 54A includes a linearization circuit 88, a bias voltage circuit 90, a positive charge pump 92, a negative charge pump 94, a tuner driver circuit 96, and a tuner circuit 98. The linearization circuit 88 is coupled between the first voltage output 80 and the tuner circuit 98. The bias voltage circuit 90 and the positive charge pump 92 are each coupled between the first voltage output 80 and the tuner driver circuit 96. The negative charge pump 94 is coupled between the second voltage output 86 and the tuner driver circuit 96. The tuner driver circuit 96 is coupled to the voltage input 62. The tuner circuit 98 is coupled between the tuner driver circuit 96 and a signal output 100, which can be coupled to a respective one of the antenna ports 26(1)-26(N) in FIG. 2A. The tuner circuit 98 receives a respective one of the RF signals 32(1)-32(N) and outputs the respective one of the RF signals 32(1)-32(N) to the signal output 100.

The positive charge pump 92 is configured to generate a positive reference voltage $V_{PREF}$ (e.g., 3 V or 500 mV) based on the supply voltage $V_{SUP}$ or the positive supply voltage $V_{PSUP}$ at the first voltage output 80. The negative charge pump 94 is configured to generate a negative reference voltage $V_{NREF}$ (e.g., −2.5 V) based on the supply voltage $V_{SUP}$ or the negative supply voltage $V_{NSUP}$ at the second voltage output 86. The positive reference voltage $V_{PREF}$ and/or the negative reference voltage $V_{NREF}$ are used to bias RF switches (not shown) in the tuner driver circuit 96 for optimum performance (e.g., on-resistance, off-capacitance, linearity, and/or voltage handling).

The linearization circuit 88 may include a digital to analog converter (DAC) (not shown) configured to create a programmable bias voltage $V_{BIA}$ to turn on/off state linearity function in the tuner circuit 98 for optimum performance. The bias voltage circuit 90 is coupled to the first voltage output 80 and configured to generate a body reference voltage $V_{BON}$ to minimize a threshold voltage of the tuner driver circuit 96.

The multi-mode antenna tuner circuit 54A includes an oscillator 102 and a clock multiplexer 104 (denoted as "CLK"). The oscillator 102 is coupled to the bandgap reference circuit 70 and configured to generate and provide a reference frequency $f_{REF}$ to the negative charge pump 94. The clock multiplexer 104 includes a first clock input 106, a second clock input 108, and a first clock output 110. The first clock input 106 is coupled to the oscillator 102 and the negative charge pump 94. The second clock input 108 is coupled to the GND. The first clock output 110 is coupled to the positive charge pump 92.

The multi-mode antenna tuner circuit 54A may include a first filter circuit 112, a second filter circuit 114, a third filter circuit 116, a fourth filter circuit 118, a fifth filter circuit 120, and a sixth filter circuit 122. In a non-limiting example, each of the first filter circuit 112, the second filter circuit 114, the third filter circuit 116, the fourth filter circuit 118, the fifth filter circuit 120, and the sixth filter circuit 122 is a resistor-capacitor (RC) filter. The first filter circuit 112 is coupled between the voltage input 62 and the positive LDO regulator 66. The second filter circuit 114 is coupled between the voltage input 62 and the negative LDO regulator 68. The third filter circuit 116 is coupled between the voltage input 62 and the tuner driver circuit 96. The first filter circuit 112, the second filter circuit 114, and the third filter circuit 116 are configured to reduce ripple in the supply voltage $V_{SUP}$. The fourth filter circuit 118 is coupled between the first voltage output 80 and the positive charge pump 92. The fourth filter circuit 118 is configured to reduce ripple in the supply voltage $V_{SUP}$ or the positive supply voltage $V_{PSUP}$. The fifth filter circuit 120 is coupled between the second voltage output 86 and the negative charge pump 94. The fifth filter circuit 120 is configured to reduce ripple in the supply voltage $V_{SUP}$ or the negative supply voltage $V_{NSUP}$. The sixth filter circuit 122 is coupled between the positive charge pump 92 and the tuner driver circuit 96. The sixth filter circuit 122 is configured to reduce ripple in the positive reference voltage $V_{PREF}$.

The multi-mode antenna tuner circuit 54A further includes a low current voltage switch 124 coupled between the first voltage output 80 and the tuner driver circuit 96. In a non-limiting example, the low current voltage switch 124 can be a silicon-on-insulator (SOI) switch that draws as little as 10 µA of electrical current.

Herein, the low current voltage switch 124 is referred to as a first set of circuits in the multi-mode antenna tuner circuit 54A. The positive LDO regulator 66, the negative LDO regulator 68, the bandgap reference circuit 70, the linearization circuit 88, the positive charge pump 92, and the clock multiplexer 104 are collectively referred to as a second set of circuits in the multi-mode antenna tuner circuit 54A. The first set of circuits, when activated, can perform a reduced functionality and consume a first amount of electrical current. The second set of circuits, when activated, can perform a full-fledged functionality but consume a second amount of electrical current higher than the first amount of electrical current.

As such, the first set of circuits may be preconfigured to activate in the low-current mode and deactivate in the high-power mode. In contrast, the second set of circuits can be preconfigured to deactivate in the low-current mode and activate in the high-power mode. In a non-limiting example, the first set of circuits can be preconfigured to automatically activate when the register 60 is set to the binary value "0" and deactivate when the register 60 is set to the binary value "1." Similarly, the second set of circuits can be preconfigured to automatically deactivate when the register 60 is set to the binary value "0" and activate when the register 60 is set to the binary value "1." It should be noted that the positive voltage multiplexer 72, the negative voltage multiplexer 74, the oscillator 102, and the negative charge pump 94 are required in both the low-current mode and the high-power mode and may not be deactivated.

In the low-current mode, the positive voltage multiplexer 72 receives the supply voltage $V_{SUP}$ via the first voltage input 76 and outputs the supply voltage $V_{SUP}$ via the first voltage output 80. The negative voltage multiplexer 74 receives the supply voltage $V_{SUP}$ via the third voltage input 82 and outputs the supply voltage $V_{SUP}$ via the second voltage output 86. As a result, the positive LDO regulator 66 and the negative LDO regulator 68 are both bypassed. As the bandgap reference circuit 70 is deactivated, the oscillator 102 is self-biased to generate a reduced reference frequency $f_{REF1}$ slower than the reference frequency $f_{REF}$. The low current voltage switch 124 is configured to provide the supply voltage $V_{SUP}$ to the tuner driver circuit 96, bypassing the positive charge pump 92.

In the high-power mode, the positive LDO regulator 66 is activated. Accordingly, the positive voltage multiplexer 72 receives the positive supply voltage $V_{PSUP}$ via the second voltage input 78 and outputs the positive supply voltage $V_{PSUP}$ via the first voltage output 80. The negative LDO regulator 68 is also activated. Accordingly, the negative voltage multiplexer 74 receives the negative supply voltage $V_{NSUP}$ via the fourth voltage input 84 and outputs the negative supply voltage $V_{NSUP}$ via the second voltage output 86. The bandgap reference circuit 70 provides the clock reference voltage $V_{CLK}$ to the oscillator 102 to generate the reference frequency $f_{REF}$. The clock multiplexer 104 provides the reference frequency $f_{REF}$ to the positive charge pump 92. Since the low current voltage switch 124 is deactivated, the positive charge pump 92 generates and provides the positive reference voltage $V_{PREF}$ to the tuner driver circuit 96.

Figure 3B:
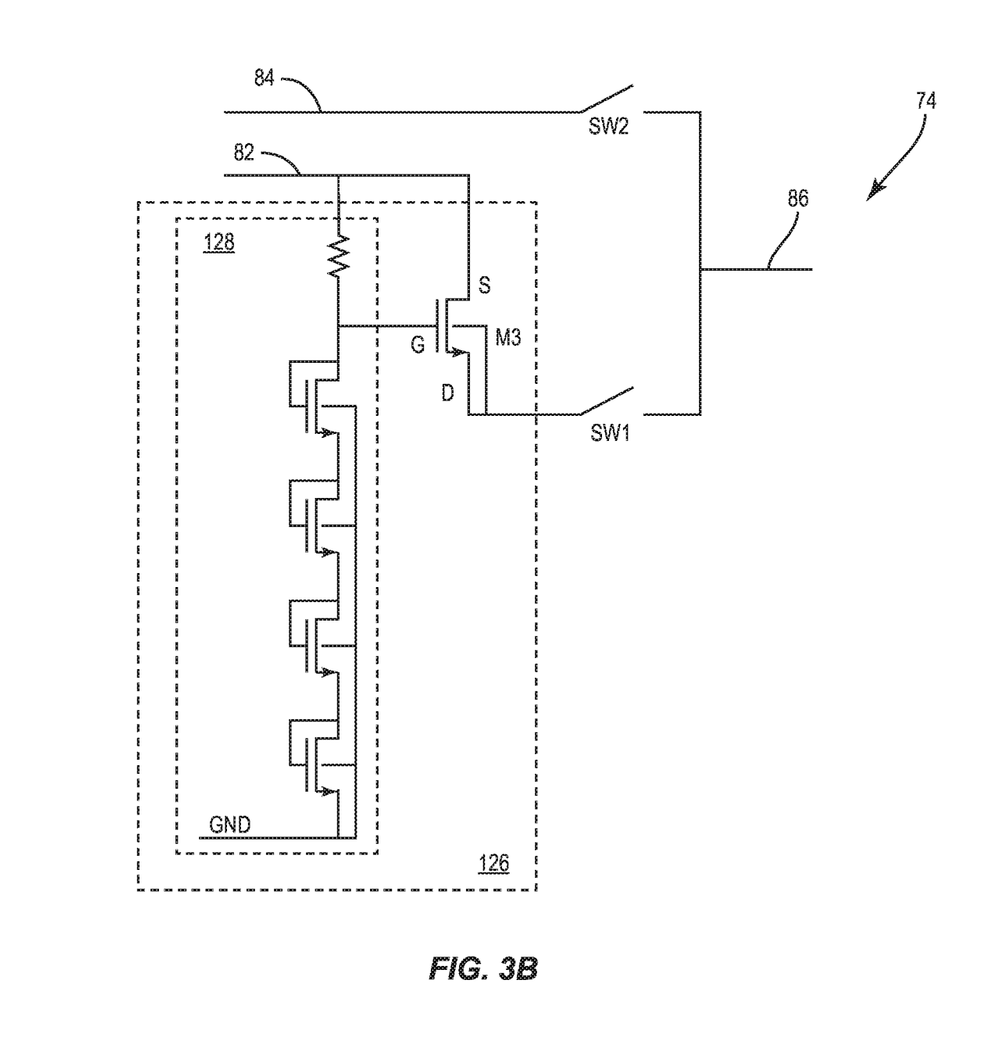
FIG. 3B is a schematic diagram of an exemplary negative voltage multiplexer configured according to an embodiment of the present disclosure.

As mentioned earlier, the supply voltage $V_{SUP}$ generated by the capacitor $C_V$ can vary between 1.65 V and 1.95 V. As such, the negative voltage multiplexer 74 is configured to level shift the supply voltage $V_{SUP}$ in the low-current mode to maintain stability of the supply voltage $V_{SUP}$. In this regard, FIG. 3B is a schematic diagram providing an exemplary illustration of the negative voltage multiplexer 74 in the multi-mode antenna tuner circuit 54A of FIG. 3A.

The negative voltage multiplexer 74 includes a first switch SW1 and a second switch SW2. Each of the first switch SW1 and the second switch SW2 may be an SOI switch, as an example. The first switch SW1 and the second switch SW2 are configured to be closed and opened, respectively, in the low-current mode such that the third voltage input 82 can be coupled to the second voltage output 86. In contrast, the first switch SW1 and the second switch SW2 are configured to be opened and closed, respectively, in the high-power mode such that the fourth voltage input 84 can be coupled to the second voltage output 86.

The negative voltage multiplexer 74 includes a voltage compensation circuit 126 coupled between the third voltage input 82 and the second voltage output 86. In a non-limiting example, the voltage compensation circuit 126 includes a shunt path 128 and a transistor M3. The shunt path 128 is coupled between the third voltage input 82 and the GND. The transistor M3, which may be a metal-oxide-silicon (MOS) transistor, as an example, includes a gate G coupled to the shunt path 128, a source S coupled to the third voltage input 82, and a drain D coupled to the first switch SW1.

When the supply voltage $V_{SUP}$ at the third voltage input 82 is low (e.g., at 1.65 V), the gate G will be mostly off to cause the supply voltage $V_{SUP}$ to be level shifted to the second voltage output 86. When the supply voltage $V_{SUP}$ at the third voltage input 82 is high (e.g., at 1.95 V), the shunt path 128 becomes conductive to pull the supply voltage $V_{SUP}$ down to compensate for the increase of the supply voltage $V_{SUP}$. As a result, the voltage compensation circuit 126 can reduce variability of the supply voltage $V_{SUP}$ in the low-current mode.

Figure 4A:
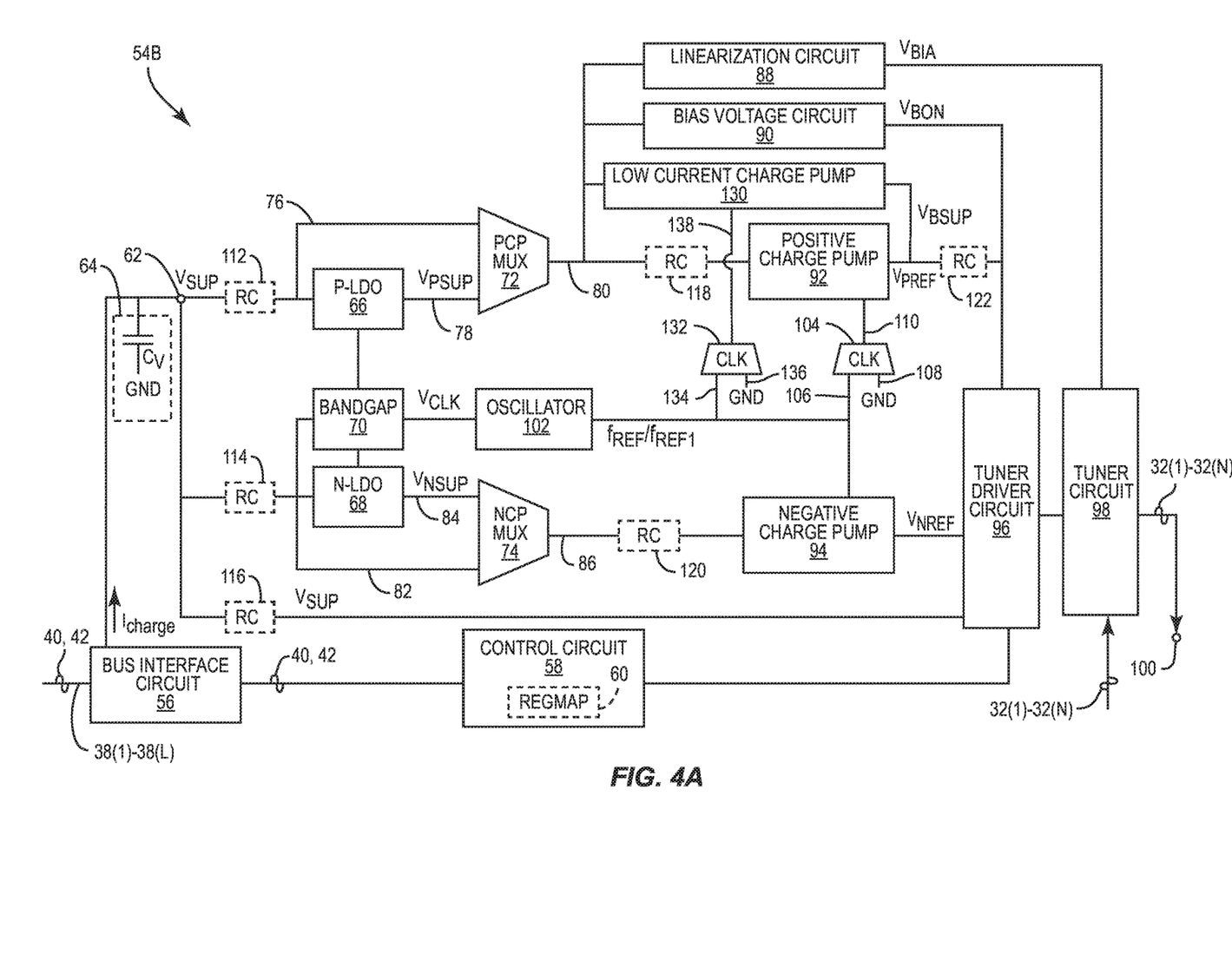
FIG. 4A is a schematic diagram of an exemplary multi-mode antenna tuner circuit configured according to another embodiment of the present disclosure.

FIG. 4A is a schematic diagram of an exemplary multi-mode antenna tuner circuit 54B configured according to another embodiment of the present disclosure. The multi-mode antenna tuner circuit 54B can be provided in any of the antenna front-end circuits 24(1)-24(N) to function as any of the multi-mode antenna tuner circuits 30(1)-30(M).

The multi-mode antenna tuner circuit 54B includes a low current charge pump 130 coupled between the first voltage output 80 and the tuner driver circuit 96. The multi-mode antenna tuner circuit 54B also includes a second clock multiplexer 132 (denoted as "CLK"). The second clock multiplexer 132 includes a third clock input 134, a fourth clock input 136, and a second clock output 138. The third clock input 134 is coupled to the oscillator 102, the fourth clock input 136 is coupled to the GND, and the second clock output 138 is coupled to the low current charge pump 130. Herein, the low current charge pump 130 and the second clock multiplexer 132 are collectively referred to as the first set of circuits in the multi-mode antenna tuner circuit 54B, which is activated in the low-current mode and deactivated in the high-power mode. The positive LDO regulator 66, the negative LDO regulator 68, the bandgap reference circuit 70, the linearization circuit 88, the positive charge pump 92, and the clock multiplexer 104 are collectively referred to as the second set of circuits in the multi-mode antenna tuner circuit 54B, which is deactivated in the low-current mode and activated in the high-power mode. The positive voltage multiplexer 72, the negative voltage multiplexer 74, the oscillator 102, and the negative charge pump 94 are required in both the low-current mode and the high-power mode and may not be deactivated.

In the low-current mode, the positive voltage multiplexer 72 receives the supply voltage $V_{SUP}$ via the first voltage input 76 and outputs the supply voltage $V_{sup}$ via the first voltage output 80. The negative voltage multiplexer 74 receives the supply voltage $V_{SUP}$ via the third voltage input 82 and outputs the supply voltage $V_{SUP}$ via the second voltage output 86. As a result, the positive LDO regulator 66 and the negative LDO regulator 68 are both bypassed. As the bandgap reference circuit 70 is deactivated, the oscillator 102 is self-biased to generate the reduced reference frequency $f_{REF1}$. The low current charge pump 130 is configured to boost the supply voltage $V_{SUP}$ (e.g., by 1.5 times) to generate a boosted supply voltage $V_{BSUP}$ and provide the boosted supply voltage $V_{BSUP}$ to the tuner driver circuit 96.

In the high-power mode, the positive LDO regulator 66 is activated. Accordingly, the positive voltage multiplexer 72 receives the positive supply voltage $V_{PSUP}$ via the second voltage input 78 and outputs the positive supply voltage $V_{PSUP}$ via the first voltage output 80. The negative LDO regulator 68 is also activated. Accordingly, the negative voltage multiplexer 74 receives the negative supply voltage $V_{NSUP}$ via the fourth voltage input 84 and outputs the negative supply voltage $V_{NSUP}$ via the second voltage output 86. The bandgap reference circuit 70 provides the clock reference voltage $V_{CLK}$ to the oscillator 102 to generate the reference frequency $f_{REF}$. The clock multiplexer 104 provides the reference frequency $f_{REF}$ to the positive charge pump 92. Since the low current charge pump 130 is deactivated, the second clock multiplexer 132 is also deactivated. As a result, the positive charge pump 92 generates and provides the positive reference voltage $V_{PREF}$ to the tuner driver circuit 96.

Figure 4B:
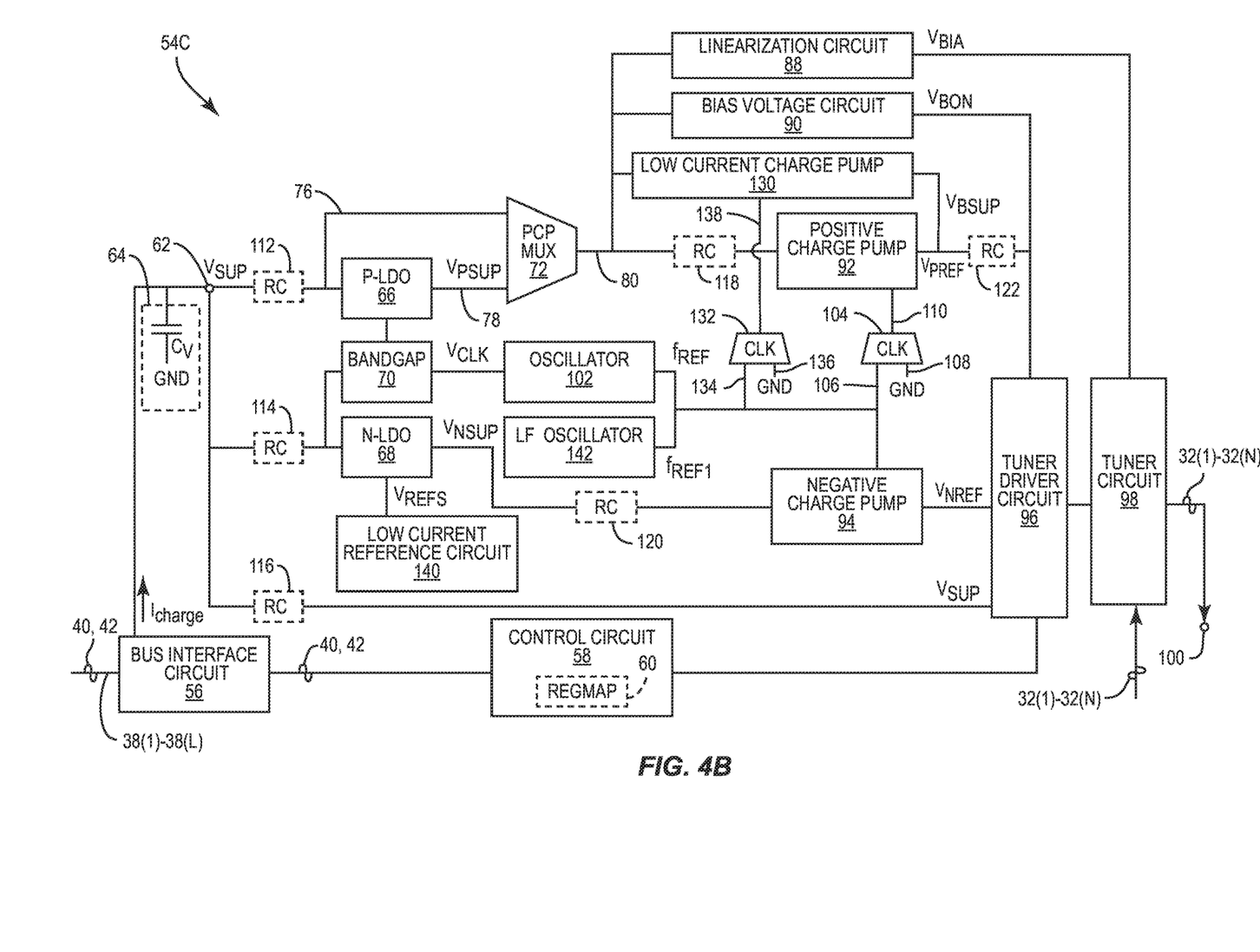
FIG. 4B is a schematic diagram of an exemplary multi-mode antenna tuner circuit configured according to another embodiment of the present disclosure.

FIG. 4B is a schematic diagram of an exemplary multi-mode antenna tuner circuit 54C configured according to another embodiment of the present disclosure. The multi-mode antenna tuner circuit 54C can be provided in any of the antenna front-end circuits 24(1)-24(N) to function as any of the multi-mode antenna tuner circuits 30(1)-30(M).

In the multi-mode antenna tuner circuit 54C, the negative LDO regulator 68 is coupled directly to the fifth filter circuit 120. The multi-mode antenna tuner circuit 54C includes a low current reference circuit 140. The low current reference circuit 140 is configured to provide a stable reference voltage $V_{REFS}$ to the negative LDO regulator 68. As a result, the negative LDO regulator 68 is decoupled from the bandgap reference circuit 70.

The multi-mode antenna tuner circuit 54C also includes a low-frequency oscillator 142 (denoted as "LF Oscillator"). The low-frequency oscillator 142 is configured to generate the reduced reference frequency $f_{REF1}$ in the low-current mode. As a result, the oscillator 102 can be deactivated in the low-current mode. Given that the multi-mode antenna tuner circuit 54C no longer includes the negative voltage multiplexer 74, as shown in FIG. 4A, the negative LDO regulator 68 will not be deactivated in the low-current mode.

In this regard, the low current charge pump 130, the second clock multiplexer 132, and the low-frequency oscillator 142 are collectively referred to as the first set of circuits in the multi-mode antenna tuner circuit 54C, which is activated in the low-current mode and deactivated in the high-power mode. The positive LDO regulator 66, the bandgap reference circuit 70, the linearization circuit 88, the positive charge pump 92, the clock multiplexer 104, and the oscillator 102 are collectively referred to as the second set of circuits in the multi-mode antenna tuner circuit 54C, which is deactivated in the low-current mode and activated in the high-power mode. The positive voltage multiplexer 72, the negative LDO regulator 68, the low current reference circuit 140, and the negative charge pump 94 are required in both the low-current mode and the high-power mode and may not be deactivated.

In the low-current mode, the positive voltage multiplexer 72 receives the supply voltage $V_{SUP}$ via the first voltage input 76 and outputs the supply voltage $V_{SUP}$ via the first voltage output 80. As a result, the positive LDO regulator 66 is bypassed. The negative LDO regulator 68 generates the negative supply voltage $V_{NSUP}$ based on the stable reference voltage $V_{REFS}$ and provides the negative supply voltage $V_{NSUP}$ to the negative charge pump 94. As the oscillator 102 is deactivated, the low-frequency oscillator 142 generates and provides the reduced reference frequency $f_{REF1}$ to the negative charge pump 94. The second clock multiplexer 132 provides the reduced reference frequency $f_{REF1}$ to the low current charge pump 130. The low current charge pump 130 is configured to boost the supply voltage $V_{SUP}$ (e.g., by 1.5 times) to generate the boosted supply voltage $V_{BSUP}$ and provide the boosted supply voltage $V_{BSUP}$ to the tuner driver circuit 96.

In the high-power mode, the positive LDO regulator 66 is activated. Accordingly, the positive voltage multiplexer 72 receives the positive supply voltage $V_{PSUP}$ via the second voltage input 78 and outputs the positive supply voltage $V_{PSUP}$ via the first voltage output 80. The negative LDO regulator 68 generates the negative supply voltage $V_{NSUP}$ based on the stable reference voltage $V_{REFS}$ and provides the negative supply voltage $V_{NSUP}$ to the negative charge pump 94. The bandgap reference circuit 70 provides the clock reference voltage $V_{CLK}$ to the oscillator 102 to generate the reference frequency $f_{REF}$. The clock multiplexer 104 provides the reference frequency $f_{REF}$ to the positive charge pump 92. Since the low current charge pump 130 is also deactivated, the low-frequency oscillator 142 and the second clock multiplexer 132 are also deactivated. As a result, the positive charge pump 92 generates and provides the positive reference voltage $V_{PREF}$ to the tuner driver circuit 96.

Those skilled in the art will recognize improvements and modifications to the embodiments of the present disclosure. All such improvements and modifications are considered within the scope of the concepts disclosed herein and the claims that follow.

What is claimed is:

1. A multi-mode antenna tuner circuit comprising:
   a voltage input coupled to a voltage source to receive a supply voltage;
   a signal output coupled to an antenna port to output a radio frequency (RF) signal;
   a first set of circuits that collectively consume a first amount of electrical current;
   a second set of circuits that collectively consume a second amount of electrical current larger than the first amount of electrical current; and
   a control circuit comprising a register and configured to:
   receive an instruction that indicates a low-current mode or a high-power mode;
   set the register to a first value to thereby cause the first set of circuits to be activated and the second set of circuits to be deactivated when the instruction indicates the low-current mode; and
   set the register to a second value different from the first value to thereby cause the first set of circuits to be deactivated and the second set of circuits to be activated when the instruction indicates the high-power mode.

2. The multi-mode antenna tuner circuit of claim 1 wherein the control circuit is further configured to set the register to the first value after a delay period from receiving the instruction that indicates the low-current mode.

3. The multi-mode antenna tuner circuit of claim 1 further comprising:
   a positive low-dropout (LDO) regulator, a negative LDO regulator, and a bandgap reference circuit each coupled to the voltage input;
   a positive voltage multiplexer having a first voltage input coupled to the voltage input, a second voltage input coupled to the positive LDO regulator, and a first voltage output;
   a linearization circuit, a bias voltage circuit, and a positive charge pump each coupled to the first voltage output;

a negative charge pump coupled to the negative LDO regulator;

an oscillator coupled to the bandgap reference circuit;

a clock multiplexer having a first clock input coupled to the oscillator and the negative charge pump, a second clock input coupled to a ground, and a first clock output coupled to the positive charge pump;

a tuner driver circuit coupled to the voltage input, the positive charge pump, and the negative charge pump;

a tuner circuit coupled to the tuner driver circuit, the linearization circuit, the control circuit, and the signal output; and a bus interface circuit coupled to the voltage input and the control circuit.

4. The multi-mode antenna tuner circuit of claim 3 further comprising:

a first filter circuit coupled between the voltage input and the positive LDO regulator;

a second filter circuit coupled between the voltage input and the negative LDO regulator;

a third filter circuit coupled between the voltage input and the tuner driver circuit;

a fourth filter circuit coupled between the first voltage output and the positive charge pump;

a fifth filter circuit coupled between the negative LDO regulator and the negative charge pump; and a sixth filter circuit coupled between the positive charge pump and the tuner driver circuit.

5. The multi-mode antenna tuner circuit of claim 3 further comprising a negative voltage multiplexer having a third voltage input coupled to the voltage input, a fourth voltage input coupled to the negative LDO regulator, and a second voltage output coupled to the negative charge pump.

6. The multi-mode antenna tuner circuit of claim 5 wherein the negative voltage multiplexer comprises a voltage compensation circuit coupled between the third voltage input and the second voltage output, the voltage compensation circuit configured to reduce variability of the supply voltage.

7. The multi-mode antenna tuner circuit of claim 5 further comprising a low current voltage switch coupled between the first voltage output and the tuner driver circuit, wherein:

the first set of circuits comprises the low current voltage switch; and the second set of circuits comprises the positive LDO regulator, the negative LDO regulator, the bandgap reference circuit, the linearization circuit, the positive charge pump, and the clock multiplexer.

8. The multi-mode antenna tuner circuit of claim 7 wherein in the low-current mode:

the positive voltage multiplexer is configured to receive the supply voltage via the first voltage input and output the supply voltage via the first voltage output;

the negative voltage multiplexer is configured to receive the supply voltage via the third voltage input and output the supply voltage via the second voltage output;

the oscillator is configured to be self-biased to a reduced reference frequency; and the low current voltage switch is configured to provide the supply voltage to the tuner driver circuit.

9. The multi-mode antenna tuner circuit of claim 5 further comprising:

a low current charge pump coupled between the first voltage output and the tuner driver circuit; and a second clock multiplexer having a third clock input coupled to the oscillator, a fourth clock input coupled to the ground, and a second clock output coupled to the low current charge pump;

wherein:

the first set of circuits comprises the low current charge pump and the second clock multiplexer; and the second set of circuits comprises the positive LDO regulator, the negative LDO regulator, the bandgap reference circuit, the linearization circuit, the positive charge pump, and the clock multiplexer.

10. The multi-mode antenna tuner circuit of claim 9 wherein in the low-current mode:

the positive voltage multiplexer is configured to receive the supply voltage via the first voltage input and output the supply voltage via the first voltage output;

the negative voltage multiplexer is configured to receive the supply voltage via the third voltage input and output the supply voltage via the second voltage output;

the oscillator is configured to be self-biased to generate a reduced reference frequency;

the second clock multiplexer is configured to provide the reduced reference frequency to the low current charge pump; and the low current charge pump is configured to provide a boosted supply voltage to the tuner driver circuit.

11. The multi-mode antenna tuner circuit of claim 3 further comprising:

a low current reference circuit coupled to the negative LDO regulator;

a low current charge pump coupled between the first voltage output and the tuner driver circuit;

a second clock multiplexer having a third clock input coupled to the oscillator, a fourth clock input coupled to the ground, and a second clock output coupled to the low current charge pump; and a low-frequency oscillator coupled to the third clock input;

wherein:

the first set of circuits comprises the low current charge pump, the second clock multiplexer, and the low-frequency oscillator; and the second set of circuits comprises the positive LDO regulator, the bandgap reference circuit, the linearization circuit, the positive charge pump, and the clock multiplexer.

12. The multi-mode antenna tuner circuit of claim 11 wherein in the low-current mode:

the positive voltage multiplexer is configured to receive the supply voltage via the first voltage input and output the supply voltage via the first voltage output;

the low-frequency oscillator is configured to generate a reduced reference frequency;

the second clock multiplexer is configured to provide the reduced reference frequency to the low current charge pump; and the low current charge pump is configured to provide a boosted supply voltage to the tuner driver circuit.

13. A wireless communication apparatus comprising:

one or more antenna front-end circuits, each comprising:
an antenna port coupled to an antenna; and
a plurality of multi-mode antenna tuner circuits coupled to the antenna port, each comprising:
a voltage input coupled to a voltage source to receive a supply voltage;
a signal output coupled to the antenna port to output a radio frequency (RF) signal;

a first set of circuits that collectively consume a first amount of electrical current;

a second set of circuits that collectively consume a second amount of electrical current larger than the first amount of electrical current; and a control circuit comprising a register and configured to:

receive an instruction that indicates the low-current mode or the high-power mode;

set the register to a first value to thereby cause the first set of circuits to be activated and the second set of circuits to be deactivated when the instruction indicates the low-current mode; and set the register to a second value different from the first value to thereby cause the first set of circuits to be deactivated and the second set of circuits to be activated when the instruction indicates the high-power mode; and a master control circuit coupled to the one or more antenna front-end circuits and configured to:

determine that at least one multi-mode antenna tuner circuit among the plurality of multi-mode antenna tuner circuits in at least one of the one or more antenna front-end circuits can operate in a low-current mode; and cause the at least one multi-mode antenna tuner circuit to operate in the low-current mode.

14. The wireless communication apparatus of claim 13 wherein the master control circuit is further configured to:

determine that at least another multi-mode antenna tuner circuit among the plurality of multi-mode antenna tuner circuits in the at least one of the one or more antenna front-end circuits can operate in a high-power mode; and cause the at least another multi-mode antenna tuner circuit to operate in the high-power mode.

15. The wireless communication apparatus of claim 14 wherein the master control circuit is further configured to determine the low-current mode and the high-power mode based on one or more factors selected from the group consisting of: environmental condition, radio frequency (RF) condition, antenna impedance measurement, and battery condition.

16. The wireless communication apparatus of claim 13, further comprising:

a bus control circuit coupled to the master control circuit; and one or more single-wire buses configured to couple the bus control circuit to the plurality of multi-mode antenna tuner circuits in each of the one or more antenna front-end circuits, each of the plurality of multi-mode antenna tuner circuits in each of the one or more antenna front-end circuits is identified by a unique slave identification (USID);

wherein the master control circuit is further configured to provide the instruction that indicates the low-current mode or the high-power mode via a respective one of the one or more single-wire buses.

17. The wireless communication apparatus of claim 16 wherein each of the plurality of multi-mode antenna tuner circuits further comprises:

a positive low-dropout (LDO) regulator, a negative LDO regulator, and a bandgap reference circuit each coupled to the voltage input;

a positive voltage multiplexer having a first voltage input coupled to the voltage input, a second voltage input coupled to the positive LDO regulator, and a first voltage output;

a linearization circuit, a bias voltage circuit, and a positive charge pump each coupled to the first voltage output;

a negative charge pump coupled to the negative LDO regulator;

an oscillator coupled to the bandgap reference circuit;

a clock multiplexer having a first clock input coupled to the oscillator and the negative charge pump, a second clock input coupled to a ground, and a first clock output coupled to the positive charge pump;

a tuner driver circuit coupled to the voltage input, the positive charge pump, and the negative charge pump;

a tuner circuit coupled to the tuner driver circuit, the linearization circuit, the control circuit, and the signal output; and a bus interface circuit coupled to the voltage source and the control circuit and configured to:

receive a fast-charging current via a respective one of the one or more single-wire buses during a fast-charging period;

provide the fast-charging current to the voltage source to charge a capacitor to the supply voltage at the voltage input;

receive one or more bus telegrams comprising the instruction via the respective one of the one or more single-wire buses during a communication period; and provide the one or more bus telegrams to the control circuit.

* * * * *